(12) United States Patent
Li

(10) Patent No.: US 9,578,936 B1
(45) Date of Patent: Feb. 28, 2017

(54) AUTOMATIC LEG TUBE LOCKING DEVICE, PHOTOGRAPHY TRIPOD, UNIPOD AND CRUTCH

(71) Applicant: Zhongshan Nikow Precision Industrial Co., LTD., Zhongshan (CN)

(72) Inventor: Zhihua Li, Zhongshan (CN)

(73) Assignee: ZHONGSHAN NIKOW PRECISION INDUSTRIAL CO., LTD., Zhongshan (CN)

( * ) Notice: Subject to any disclaimer, the term of this patent is extended or adjusted under 35 U.S.C. 154(b) by 0 days.

(21) Appl. No.: 14/879,629

(22) Filed: Oct. 9, 2015

(51) Int. Cl.
| | |
|---|---|
| *A45B 9/00* | (2006.01) |
| *A61H 3/02* | (2006.01) |
| *F16B 7/14* | (2006.01) |
| *G03B 17/56* | (2006.01) |
| *A63C 11/22* | (2006.01) |

(52) U.S. Cl.
CPC ............. *A45B 9/00* (2013.01); *A61H 3/02* (2013.01); *A63C 11/221* (2013.01); *F16B 7/1409* (2013.01); *F16B 7/1436* (2013.01); *G03B 17/561* (2013.01); *A45B 2009/007* (2013.01)

(58) Field of Classification Search
CPC ..... A45B 9/00; A45B 2009/007; A45B 19/04; A63C 11/221; F16B 7/025; F16B 7/1409; F16B 7/1436; G03B 17/561; E04H 12/182; Y10T 403/32475; Y10T 403/32483; Y10T 403/32501
USPC ............................................................ 135/75
See application file for complete search history.

(56) References Cited

U.S. PATENT DOCUMENTS

| | | | | | |
|---|---|---|---|---|---|
| 2,503,997 | A | * | 4/1950 | Miller | F16B 7/1445 248/188.5 |
| 2,508,039 | A | * | 5/1950 | Neuwirth | F16B 7/1463 248/188.5 |
| 2,542,967 | A | * | 2/1951 | Waechter | F16B 7/1445 248/188.5 |
| 2,658,777 | A | * | 11/1953 | Gerard | F16B 7/1409 248/188.5 |
| 3,419,293 | A | * | 12/1968 | Conrad | F16B 7/1427 285/302 |
| 4,134,703 | A | * | 1/1979 | Hinners | A63C 11/221 248/188.5 |

(Continued)

FOREIGN PATENT DOCUMENTS

DE     20 2015 00729 U1 *  12/2015

*Primary Examiner* — Robert Canfield
(74) *Attorney, Agent, or Firm* — Leason Ellis LLP

(57) ABSTRACT

An automatic leg tube locking device including a hollow cylinder shaped guide switch and a circular truncated cone shaped guide post which are mutually matched for use. Through holes are evenly formed in the side surface of the guide switch, the through holes are adapted with locking shafts, a transmission mechanism is arranged between the guide switch and the guide post, so that the guide switch vertically moves along the inclined cylinder surface of the guide post and drives the locking shafts to move along the guide post when the guide switch and the guide post rotate relative to each other. A photography tripod, a unipod and a crutch are further provided. The automatic leg tube locking device, the photography tripod, the unipod and the crutch are capable of pulling the leg tube to any position and lock the leg tube automatically in a locking state.

8 Claims, 12 Drawing Sheets

(56) References Cited

U.S. PATENT DOCUMENTS

| | | | | |
|---|---|---|---|---|
| 4,294,560 A * | 10/1981 | Larkin | F16B 7/1427 | 248/411 |
| 4,893,810 A * | 1/1990 | Lee | A63B 21/0728 | 24/115 L |
| 4,900,182 A * | 2/1990 | Stillwagon | E05B 63/121 | 403/322.2 |
| 5,492,430 A * | 2/1996 | Jones | F16B 7/149 | 248/188.5 |
| 5,593,239 A * | 1/1997 | Sallee | E04H 12/182 | 135/114 |
| 6,250,839 B1 * | 6/2001 | Lenhart | A63C 11/221 | 135/75 |
| 6,331,091 B2 * | 12/2001 | Cross | 403/316 | |
| 6,609,686 B2 * | 8/2003 | Malizia | F16B 7/1409 | 248/125.8 |
| 8,297,870 B2 * | 10/2012 | Lenhart | A45B 9/00 | 135/75 |
| 8,418,707 B2 * | 4/2013 | Kim | A45B 9/00 | 135/65 |
| 2002/0170587 A1 * | 11/2002 | Uemura | A45B 9/00 | 135/65 |
| 2004/0211034 A1 * | 10/2004 | Chen | F16B 7/1463 | 16/113.1 |
| 2009/0274511 A1 * | 11/2009 | Chen | F16B 7/1427 | 403/109.5 |
| 2010/0040406 A1 * | 2/2010 | Lenhart | A45B 9/00 | 403/109.5 |
| 2011/0248144 A1 * | 10/2011 | Lee | F16B 9/023 | 248/574 |
| 2013/0028656 A1 * | 1/2013 | Lu | F16B 7/1463 | 403/109.1 |
| 2015/0059816 A1 * | 3/2015 | Kim | A45B 9/00 | 135/75 |
| 2016/0169420 A1 * | 6/2016 | Hu | F16B 7/025 | 138/147 |

* cited by examiner

AUTOMATIC LEG TUBE LOCKING DEVICE, PHOTOGRAPHY TRIPOD, UNIPOD AND CRUTCH

TECHNICAL FIELD

The present invention relates to an automatic leg tube locking device, a photography tripod, a unipod and a crutch.

BACKGROUND

Jitter is unavoidable for shooting photography or video in daily times, while a photography tripod which can provide a supporting force for the photographer is an indispensable photographic apparatus. The leg tube of the tripod is relatively long generally, which is inconvenient to carry; therefore, there appears more tripods the legs of which can be fastened in a telescopic manner in the market, so that the height of the tripod can be adjusted through adjusting the length of the leg tube according to the demands of the photographer.

It is found that the prior art at least has the following defects: the length of the leg tube needs to be adjusted through an external fastening part, which is inconvenient to adjust the length of the leg, and the locking force is limited, which generally refers to screw thread knob type or buckle extrusion type locking.

SUMMARY

A technical problem to be solved by the present invention is to provide an automatic leg tube locking device which is convenient to use, increasing the locking force, quickly adjusting the loosing and locking of the leg, adjusting an individual or all of the leg tubes, and pulling the leg tube to any position and lock the leg tube automatically in a locking state.

The present invention provides an automatic leg tube locking device, including a guide switch and an truncated cone shaped guide post which are mutually cooperative in use, wherein the guide switch is a hollow cylinder without a bottom surface, the guide post is in a circular truncated cone shape, a plurality of through holes are evenly provided in the side surface of the guide switch, the through holes are adapted with locking shafts, a transmission mechanism is arranged between the guide switch and the guide post, so that the guide switch vertically moves along the inclined cylinder surface of the guide post and drives the locking shafts to move along the guide post, when the guide switch and the guide post rotate relative to each other.

Further, the upper surface of the guide post is provided with an inclined guide surface, and the inner bottom surface of the guide switch is provided with a mating surface that is mutually conflicting to the inclined guide surface.

Further, the inner bottom surface of the guide switch is fixedly provided with a guide nail, the lower end surface of the guide nail is a spherical surface, the upper surface of the guide post is provided with a guide slot adapted with the guide nail, and the guide slot is formed to have a depth that changed countinuously and gradually from deep to shallow.

Further, the lower portion of the guide post is provided with a spring and a connection screw, the connection screw traverses the spring and the guide post, and is threaded connected to the inner bottom surface of the guide switch.

Further, the through hole is an elliptical hole, and the locking shaft is in a drum shape.

Further, the through hole is a round hole, and the locking shaft is a round bead.

Further, a guard ring is arranged on a position of the circumferential/side surface of the guide switch excluding the through holes.

The present invention further provides a photography tripod, including any one of the automatic leg tube locking device mentioned above.

The present invention further provides a unipod, including any one of the automatic leg tube locking device mentioned above.

The present invention further provides a crutch, including any one of the automatic leg tube locking device mentioned above.

When utilizing the automatic leg locking device provided by the embodiment according to the present invention, for the photography tripod, the unipod and the crutch composed of multiple sections of tubes, the loosing and locking states of which can be quickly switched by holding one section of tube; for example, when an section of inner tube is rotated reversely opposite to the predetermined direction, the inner tube and the outer tube is in a loosing state; at this moment, the inner tube can telescope up and down in the outer tube; and the inner tube and the outer tube are in a locking state by rotating the last section of inner tube towards the predetermined direction; in the locking state, the inner tube is pulled down, the inner tube and the outer tube become a loosing state; at this moment, the inner tube can be locked to any position in the outer tube by pushing the inner tube upward at any position. With the above features, several technical effects are achieved: convenient to use, being capable of increasing the locking force, quickly adjusting the loosing and locking of the leg tube, adjusting the loosing and locking of the leg tube by single section or entirety, and pulling the leg tube to any position and locking the leg tube automatically in a locking state.

BRIEF DESCRIPTION OF THE DRAWINGS

The drawings illustrated herein are intended to provide further understanding of the present invention, and constituting a part of the present application. Examplary embodiments and explanations of the present invention here are only for explanation of the present invention, but are not intended to inappropriately limit the present invention. In the drawings.

DETAILED DESCRIPTION

The present invention will be further described in details hereinafter with reference to the drawings and embodiments.

First Embodiment

Figure 1:
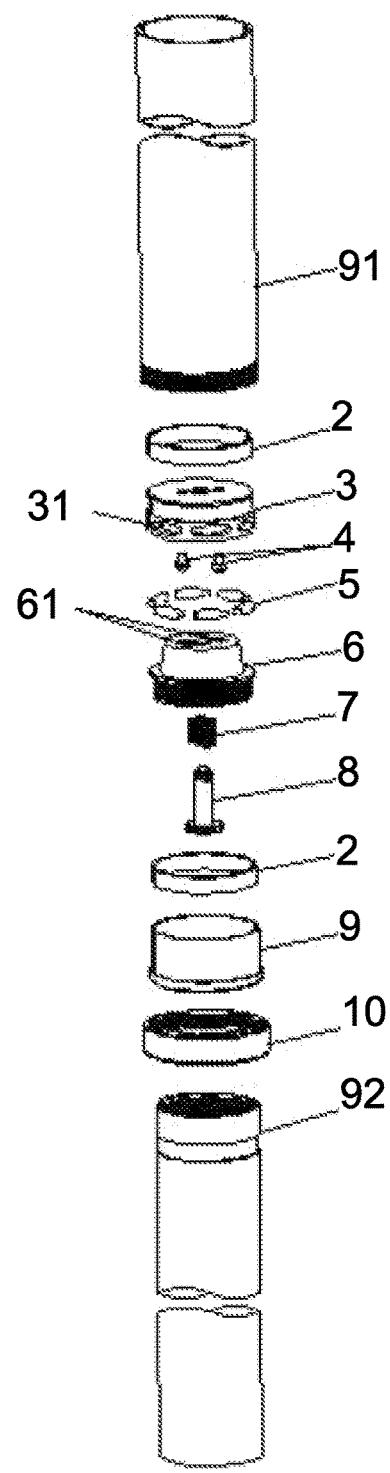
FIG. 1 schematically illustrates an exploded view of an automatic leg tube locking device given in the first embodiment of the present invention.
Figure 2:
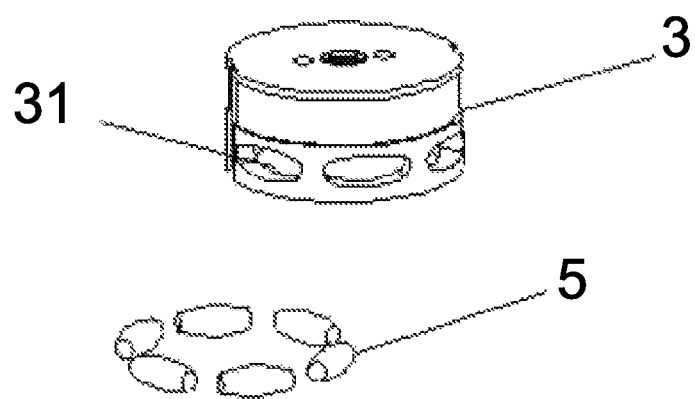
FIG. 2 schematically illustrates a guide switch and adapted locking shafts given in the first embodiment of the present invention.
Figure 3:
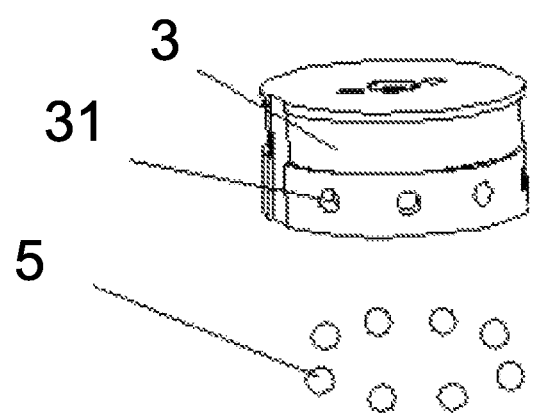
FIG. 3 schematically illustrates a guide switch and adapted locking shafts given in the first embodiment of the present invention.
Figure 4:
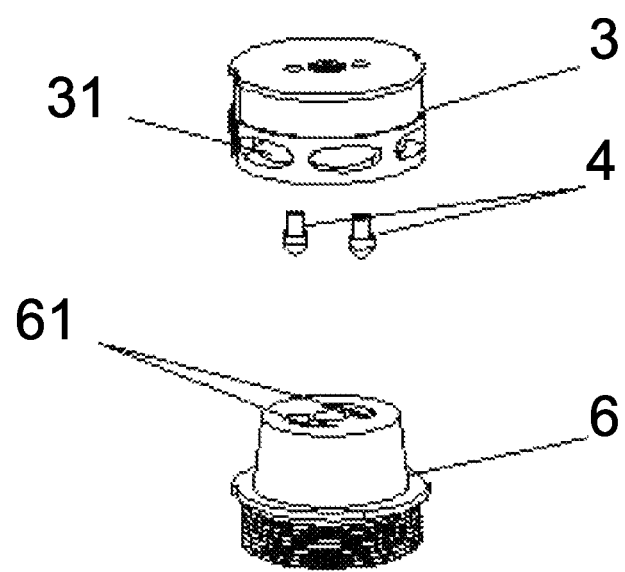
FIG. 4 schematically illustrates a guide switch, a guide nail and an guide post given in the first embodiment of the present invention.

Referring to FIG. 1 to FIG. 7, embodiments of the present invention provide an automatic leg tube locking device, including a guide switch 3 and an guide post 6. As shown in FIG. 4, the guide switch 3 is a hollow cylinder without a bottom surface, the guide post 6 is in a circular truncated cone shape, the inner bottom surface (or refer to as the opposite side to the top surface) of the guide switch 3 is provided with a guide nail 4, the lower end surface of the guide nail 4 is a spherical surface, the upper surface of the guide post 6 is provided with a guide slot 61 adapted to the guide nail 4, and the guide slot 61 is formed to have a depth that changed countinuously and gradually from deep to shallow. The guide nail 4 and the guide slot 61 constitute a set of transmission mechanism, when the guide nail 4 slides along the guide slot 61, the horizontal position of the lower end surface of the guide nail 4 will move up and down; i.e., when the guide nail 4 moves relative to the guide slot 61, the guide switch 3 can move up and down along the inclined cylinder surface of the guide post 6.

Through holes 31 are evenly formed in the side surface of the guide switch 3, the through holes 31 are adapted with locking shafts 5. As shown in FIG. 2, each through hole 31 can be an elliptical hole; at this moment, the locking shaft 5 is in a drum shape, which is namely a solid of rotation having a diameter in the middle greater than that in the two ends. As shown in FIG. 3, the through hole 31 can be a round hole; at this moment, the locking shaft 5 is a round bead. A guard ring 2 is arranged on a position of the circumferential/side surface of the guide switch 3 excluding the through holes 31.

Figure 6:
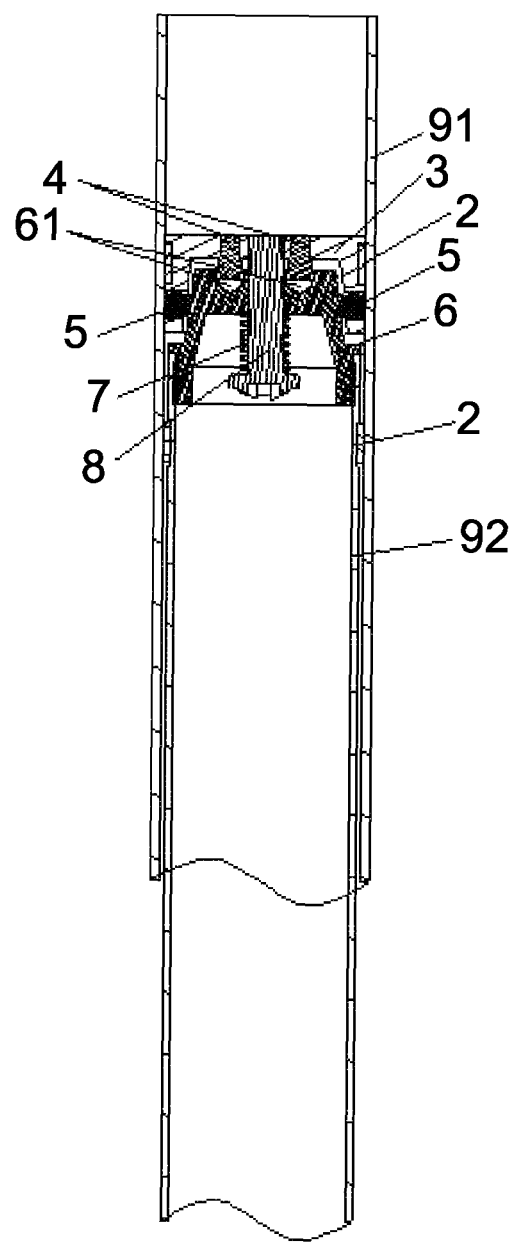
FIG. 6 schematically illustrates a locking state assembly drawing of an automatic leg tube locking device given in the first embodiment of the present invention.
Figure 7:
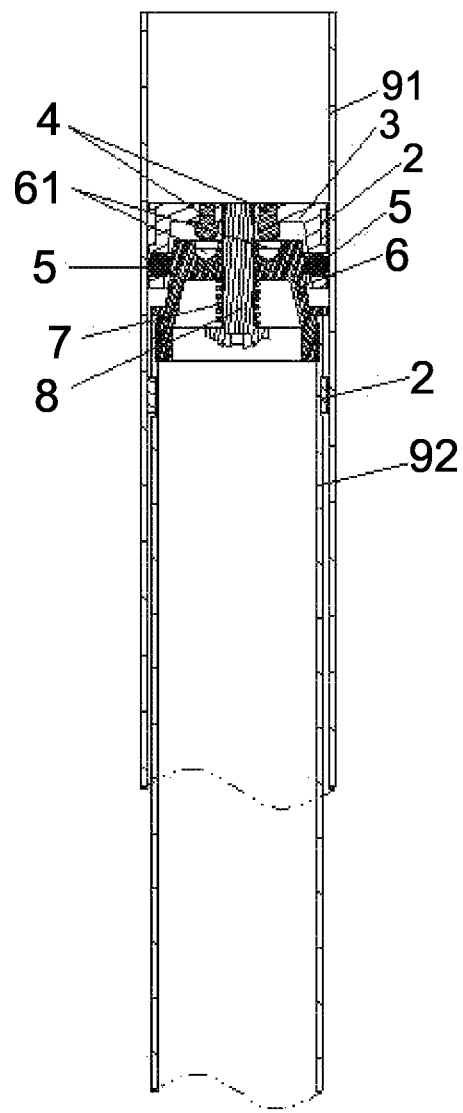
FIG. 7 schematically illustrates a loosing state assembly drawing of the automatic leg tube locking device given in the first embodiment of the present invention.

Referring to FIG. 6 and FIG. 7, the lower portion of the guide post 6 is provided with a spring 7 and a connection screw 8, the connection screw 8 traverses the spring 7 and the guide post 6, and is threaded connected to the inner bottom surface of the guide switch 3, and makes the spring 7 in a compressed state all the time, so that the guide switch 3 is close to the guide post 6 through a tensility provided by the spring 7.

Figure 8:
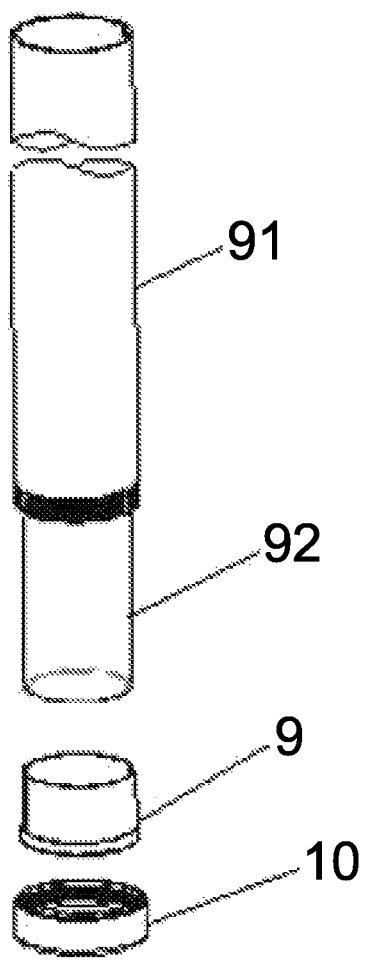
FIG. 8 schematically illustrates an exploded drawing of an outer tube, an inner protection sleeve, a connection ring and an inner tube given in the first embodiment of the present invention.
Figure 9:
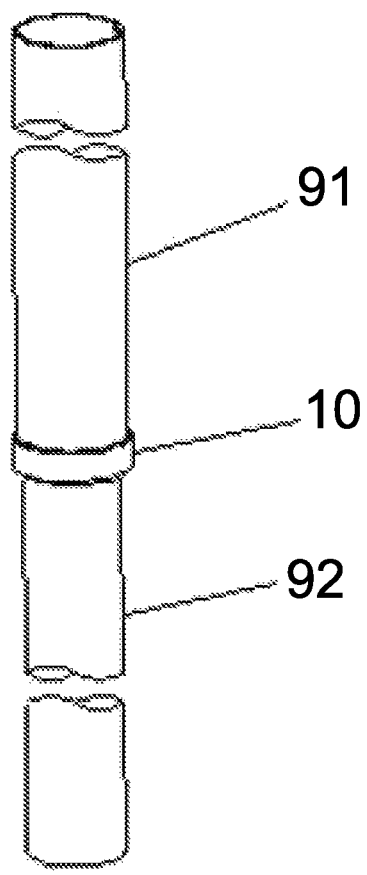
FIG. 9 schematically illustrates a connection drawing of the outer tube, the connection ring and the inner tube given in the first embodiment of the present invention.
Figure 10:
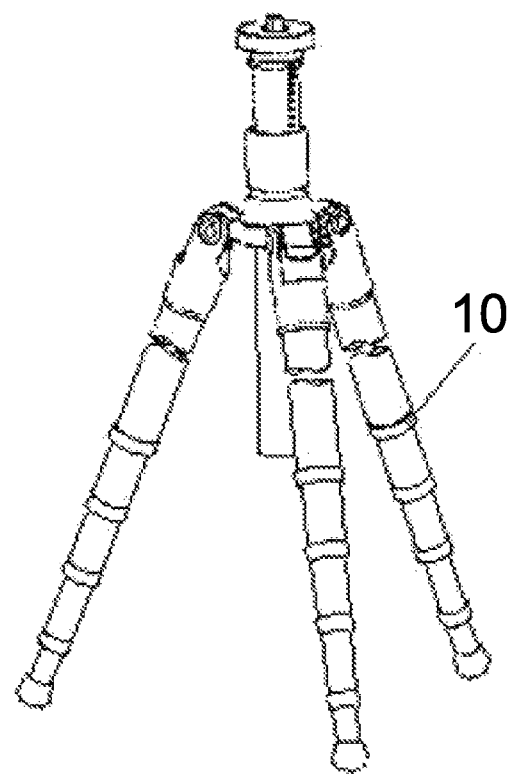
FIG. 10 schematically illustrates a photography tripod given in the first embodiment of the present invention.
Figure 11:
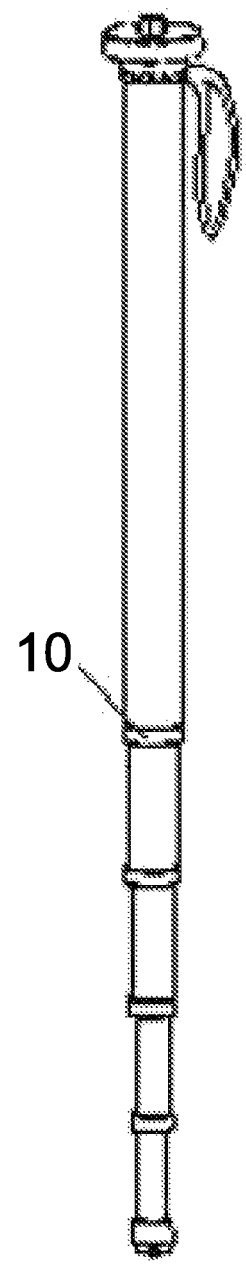
FIG. 11 schematically illustrates a unipod given in the first embodiment of the present invention.
Figure 12:
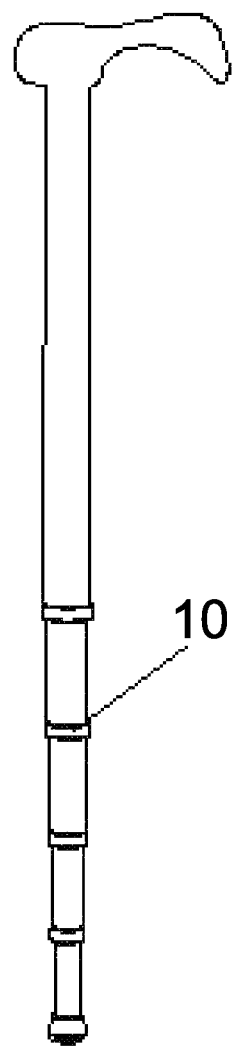
FIG. 12 schematically illustrates a crutch given in the first embodiment of the present invention.

Referring to FIG. 10 to FIG. 12, the automatic leg tube locking device is applied to the leg tubes of a photography tripod, a unipod and a crutch or the like. The leg tube includes an outer tube 91 and an inner tube 92, the outer surface on the top of the inner tube 92 is also provided with a guard ring 2, and the lower end of th guide post 6 is fixedly connected to the upper end of the inner tube 92, for example, in a screw thread connected manner. The inner tube 92 is sheathed in the outer tube 91, and coaxially stretch out or retract in the outer tube 91. As shown in FIG. 8 and FIG. 9, an inner protection sleeve 9 is arranged between the inner surface of the outer tube 91 and the outer surface of the inner tube 92, and the lower end of the outer tube 91 is connected to the outer surface of the inner tube 92 through a connection ring 10.

Method for installing and using the automatic leg tube locking device is as follows.

(1) The connection screw 8 traverses the spring 7, and being connected to the inner bottom surface of the guide switch 3 through the guide post 6, the lower end of the guide post 6 is fixedly connected to the upper end of the inner tube 92, and the inner tube 92 is sheathed in the outer tube 91.

(2) The inner tube 92 is rotated clockwise or in a predetermined direction, and the guide post 6 rotates relative to the guide switch 3, so that the guide switch 3 moves down along the inclined cylinder surface of the guide post 6; at this moment, the locking shafts 5 drop down along the inclined cylinder surface of the guide post 6, and generate an extrusion force to the periphery at the same time to compact the outer tube 91, so that the outer tube 91 and the inner tube 92 are in a locking state.

(3) The inner tube 92 is rotated reversely and the guide post 6 rotates relative to the guide switch 3, so that the guide switch 3 moves up along the inclined cylinder surface of the guide post 6; at this moment, the locking shafts 5 ascend along the inclined cylinder surface of the guide post 6; at this moment, the inner tube 92 and the outer tube 91 keep a loosing state, and the inner tube 92 can telescope in the outer tube 91.

(4) In a locking state, the locking shafts 5 generate an extrusion force to the periphery to compact the outer tube 91; pulling the inner tube 92 down is equivalent to the downward moving of the guide post 6 relative to the guide switch 3, the locking shafts 5 ascend along the inclined cylinder surface of the guide post 6, and the inner tube 92 and the outer tube 91 become a loosing state; at this moment, the inner tube 92 can be locked to any position in the outer tube 91 by pushing the inner tube 92 upward at any position.

Second Embodiment

Figure 5:
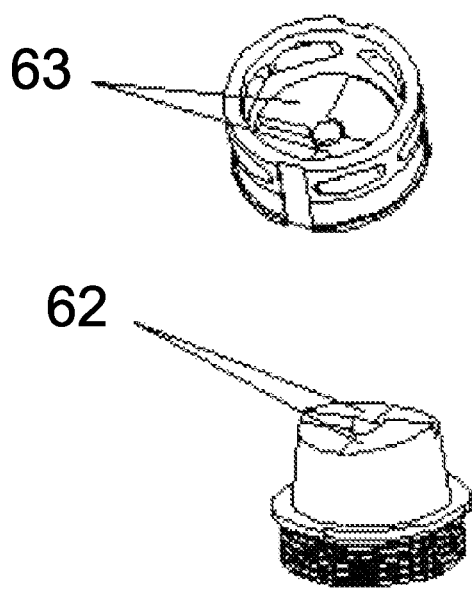
FIG. 5 schematically illustrates a guide switch and an guide post given in the second embodiment of the present invention.

This embodiment differs from the first embodiment in that: as shown in FIG. 5, the guide slot 61 in the first embodiment is cancealed; the upper surface of the guide post 6 is provided with an inclined guide surface 62, the inner bottom surface of the guide switch 3 is provided with a mating surface 63 that is mutually conflicting to the inclined guide surface 62. The inclined guide surface 62 and the mating surface 63 constitute a set of transmission mechanism. When the guide post 6 and the guide switch 3 rotate relative to each other, the mating surface 63 will move up and down along the inclined guide surface 62, so that the guide switch 3 may move up and down along the inclined cylinder surface of the guide post 6.

When utilizing the automatic leg locking device provided by the embodiment according to the present invention, for the photography tripod, the unipod and the crutch composed of multiple sections of tubes, the loosing and locking states of which can be quickly switched by holding one section of tube; for example, when an section of inner tube 92 is rotated reversely opposite to the predetermined direction, the inner tube 92 and the outer tube 91 is in a loosing state; at this moment, the inner tube 92 can telescope up and down in the outer tube 91; and the inner tube 92 and the outer tube 91 are in a locking state by rotating the last section of inner tube 92 towards the predetermined direction; in the locking state, the inner tube 92 is pulled down, the inner tube 92 and the outer tube 91 become a loosing state; at this moment, the inner tube 92 can be locked to any position in the outer tube 92 by pushing the inner tube 92 upward at any position.

The automatic leg tube locking device, the photography tripod, the unipod and the crutch provided by embodiments of the present invention are convenient to use, and are capable of increasing the locking force, quickly adjusting the loosing and locking of the leg tube, adjusting the loosing and locking of the leg tube by single section or entirety, pulling the leg tube to any position and lock the leg tube automatically in a locking status.

The above descriptions are merely preferred embodiments of the present invention, but are not intended to limit the present invention. For those skilled in the art, the present invention may have various alternations and modifications. Any modification, equivalent replacement, improvment and the like, made within the spirit and principle of the present invention, shall all fall within the protection scope of the present invention.

The invention claimed is:

1. An automatic leg tube locking device, comprising a guide switch and an guide post which are mutually cooperative in use, wherein the guide switch is a hollow cylinder without a bottom surface, the guide post is in a circular truncated cone shape, a plurality of through holes are evenly formed in the side surface of the guide switch, the through holes are provided with locking shafts, a transmission mechanism is arranged between the guide switch and the guide post, so that the guide switch vertically moves along the inclined cylinder surface of the guide post and drives the locking shafts to move along the guide post when the guide switch and the guide post rotate relative to each other, the upper surface of the guide post being provided with an inclined guide surface, and the inner bottom surface of the guide switch being provided with a mating surface that is mutually conflicting to the inclined guide surface.

2. The automatic leg tube locking device according to claim 1, wherein the inner bottom surface of the guide switch is fixedly provided with a guide nail, the lower end surface of the guide nail is a spherical surface, the upper surface of the guide post is provided with a guide slot adapted with the guide nail, and the guide slot is countinuously and gradually from deep to shallow.

3. The automatic leg tube locking device according to claim 1, wherein the lower portion of the guide post is provided with a spring and a connection screw, the connection screw traverses the spring and the guide post, and is threaded connected to the inner bottom surface of the guide switch.

4. The automatic leg tube locking device according to claim 1, wherein the through holes are elliptical holes, and the locking shafts are in a drum shape which is a solid of rotation having a diameter in the middle greater than that in the two ends.

5. The automatic leg tube locking device according to claim 1, wherein a guard ring is arranged on a position of the side surface of the guide switch excluding the through holes.

6. A photography tripod, comprising the automatic leg tube locking device according to claim 1.

7. A unipod, comprising the automatic leg tube locking device according to claim 1.

8. A crutch, comprising the automatic leg tube locking device according to claim 1.

* * * * *